(12) United States Patent
Wehrs et al.

(10) Patent No.: US 9,530,149 B2
(45) Date of Patent: *Dec. 27, 2016

(54) KEYWORD-BASED SERVICES FOR MOBILE DEVICE MESSAGES

(71) Applicant: Nuance Communications, Inc., Burlington, MA (US)

(72) Inventors: Michael E. Wehrs, Woodinville, WA (US); Bradley L. Bargen, Kirkland, WA (US)

(73) Assignee: Nuance Communications, Inc., Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/488,190

(22) Filed: Sep. 16, 2014

(65) Prior Publication Data

US 2015/0006284 A1 Jan. 1, 2015

Related U.S. Application Data

(63) Continuation of application No. 12/601,004, filed as application No. PCT/US2008/064595 on May 22, 2008, now Pat. No. 8,838,079.

(Continued)

(51) Int. Cl.
H04W 4/00 (2009.01)
H04L 12/58 (2006.01)
G06Q 30/02 (2012.01)

(52) U.S. Cl.
CPC ......... *G06Q 30/0251* (2013.01); *G06Q 30/02* (2013.01); *H04L 51/046* (2013.01)

(58) Field of Classification Search
CPC .... G06Q 30/02; G06Q 30/0251; G06Q 30/00; H04L 51/046; H04L 12/58; G06F 15/16; G06F 17/30; G06F 3/048; H04M 3/42; H04W 4/00

(Continued)

(56) References Cited

U.S. PATENT DOCUMENTS 7,020,685 B1 3/2006 Chen et al.
7,197,297 B2 3/2007 Myles et al.
(Continued)

FOREIGN PATENT DOCUMENTS

WO WO-2006005001 A2 1/2006

OTHER PUBLICATIONS

International Search Report and Written Opinion, International Application No. PCT/US08/64595, Applicant: Nuance Communications, Inc. mailed on Sep. 8, 2008, 10 pages.

(Continued)

*Primary Examiner* — Nathan Taylor
(74) *Attorney, Agent, or Firm* — Perkins Coie LLP

(57) ABSTRACT

A software and/or hardware facility that identifies keywords in a message received by a mobile device and provides advertising and contextual services to the mobile device based on a keyword selection by a user. The facility analyzes a received message to identify keywords in the message. The keywords are identified based on user-specific information that is maintained on the mobile device. The message is displayed to the user with the identified keywords highlighted to the user. When the user selects a keyword, the facility identifies one or more advertisements that are targeted to a user in a manner that takes into account user-specific information. The facility also identifies one or more contexts that are related to the keyword. The facility displays the identified advertisements and contexts to the user. If the user selects an advertisement or context, relevant services are called to deliver responsive content to the user.

20 Claims, 6 Drawing Sheets

Related U.S. Application Data

(60) Provisional application No. 60/939,520, filed on May 22, 2007.

(58) Field of Classification Search
USPC ........ 705/714, 14.64; 455/466, 414.1–414.2; 707/765, 769
See application file for complete search history.

(56) References Cited

U.S. PATENT DOCUMENTS

| | | |
|---|---|---|
| 7,286,840 B2 | 10/2007 | Jain |
| 7,319,858 B2 | 1/2008 | Lewis |
| 7,730,081 B2 | 6/2010 | Bromm et al. |
| 7,925,716 B2 * | 4/2011 | Zhang .................. G06Q 10/107 709/218 |
| 8,495,047 B2 | 7/2013 | Bookstaff |
| 8,677,020 B2 | 3/2014 | Levkovitz et al. |
| 8,700,603 B2 | 4/2014 | Gorodyansky et al. |
| 2003/0109248 A1 | 6/2003 | Lewis |
| 2005/0010641 A1 | 1/2005 | Staack |
| 2006/0085515 A1 | 4/2006 | Kurtz et al. |
| 2006/0129455 A1 * | 6/2006 | Shah ...................... G06Q 30/02 705/14.54 |
| 2006/0149630 A1 * | 7/2006 | Elliott .................... G06Q 30/02 705/14.64 |
| 2006/0242017 A1 * | 10/2006 | Libes ................ G06F 17/30864 705/14.54 |
| 2006/0276208 A1 | 12/2006 | Jain |
| 2007/0061197 A1 * | 3/2007 | Ramer ............... G06Q 30/0267 705/14.64 |
| 2007/0088687 A1 | 4/2007 | Bromm et al. |
| 2007/0088851 A1 | 4/2007 | Levkovitz et al. |
| 2008/0034088 A1 * | 2/2008 | Suresh ................ H04L 12/5895 709/224 |
| 2010/0268597 A1 * | 10/2010 | Bookstaff ......... G06F 17/30864 705/14.49 |
| 2010/0268726 A1 * | 10/2010 | Gorodyansky ... G06F 17/30867 707/765 |

OTHER PUBLICATIONS

Supplementary European Search Report for Application No. 08769655.5, dated Apr. 4, 2012, 6 pages.

* cited by examiner

KEYWORD-BASED SERVICES FOR MOBILE DEVICE MESSAGES

CROSS REFERENCE TO RELATED APPLICATION

This application is a continuation application of U.S. application Ser. No. 12/601,004, filed Jun. 14, 2010, now U.S. Pat. No. 8,838,079, which is a U.S. National Phase application of International Application Serial No. PCT/US08/64595, filed May 22, 2008, which claims priority to U.S. Provisional Patent Application No. 60/939,520 entitled "COLLECTION AND USE OF PERSONALLY-RELEVANT INFORMATION FOR MOBILE APPLICATIONS," and filed on May 22, 2007, all of which are hereby incorporated by reference.

BACKGROUND

In today's mobile economy, consumers are accustomed to sending and receiving text messages, such as Short Message Service (SMS) and/or Multimedia Messaging Service (MMS) messages, on their mobile devices. Unfortunately, consumers are not able to easily utilize information received in such messages. For example, if Jim receives a text message on his cell phone from Jill asking Jim to meet her at the Starbucks near her office, Jim must close the received message and open another application (e.g., a browser) on the device to determine the location of the nearest Starbucks to Jill's office. Requiring the user to switch between applications introduces delay and frustration in attempting to use the received information.

DETAILED DESCRIPTION

A software and/or hardware facility that dynamically identifies keywords in a message received by a mobile device and provides advertising and contextual services to the mobile device based on a keyword selection by a user is disclosed. The facility analyzes a received message to identify one or more keywords in the message. The keywords are identified based on user-specific information that is maintained on the mobile device. The message is displayed to the user with the identified keywords highlighted to the user. When the user selects a keyword, the facility identifies one or more advertisements that are targeted to a user in a manner that takes into account user-specific information. The facility also identifies one or more contexts that are related to the keyword. The facility displays the identified advertisements and contexts to the user. If the user selects one of the advertisements or contexts, relevant services are called to deliver responsive content to the user. The content may be targeted advertising or additional information related to the selected context.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Figure 1:
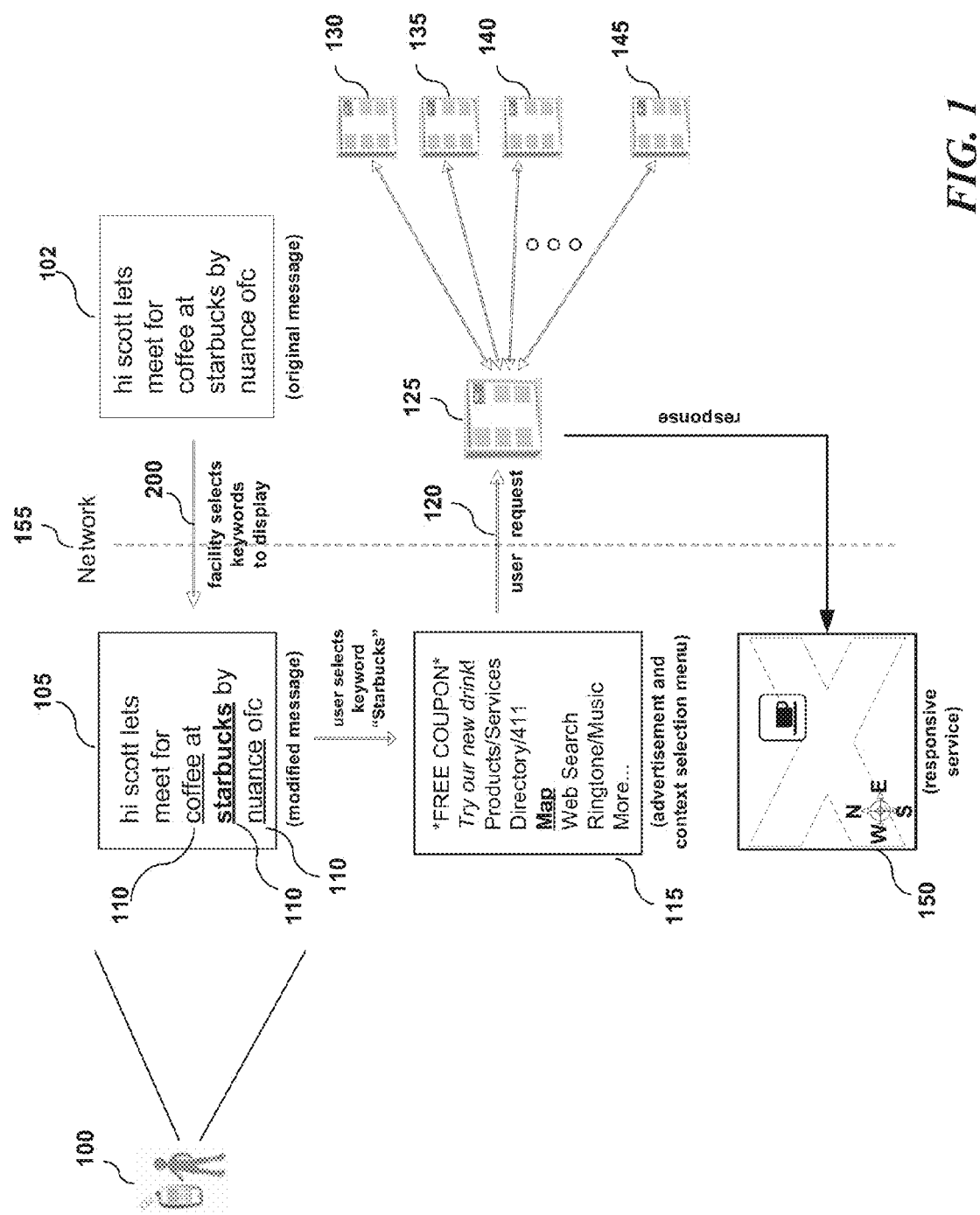
FIG. 1 is a block diagram of a software and/or hardware facility that dynamically provides services to a mobile device in response to keywords selected from mobile messages.

FIG. 1 illustrates a software and/or hardware facility that dynamically provides advertising and contextual services to a mobile device 100 based on keywords 110 identified in a received message 102. Keywords include, but are not limited to, single words, word phrases, text strings such as addresses, text fragments such as portions of a word, etc. The mobile device 100 operated by a user is capable of receiving and displaying messages, such as SMS, MMS, email, or other messaging service messages. The keywords 110 that are identified by the facility in the received message 102 are highlighted to the user in a modified message 105. Keywords may be highlighted, for example, by using a different font, a different color, underlining, or otherwise changing the appearance of the keyword. Keywords are automatically or manually identified within a received message in a variety of ways:

Keywords may be identified within received message 102 by intelligently matching message content with one or more keyword databases (collectively referred to as a "keyword inventory") stored in the mobile device 100. For example, the mobile device 100 may identify keywords using a T9 text input technology database (such as described in U.S. Pat. No. 6,307,549, hereby incorporated in its entirety by reference), or other on-device database. The keywords are identified by comparing each word in the received message with the keyword inventory. If the keyword inventory is sorted by frequency of use, common words (such as "the" "a" etc.) may be discarded and less-frequently used words may be identified. Less frequently-used words may have greater value as keywords since they may be more uniquely linked to services such as advertising. Words that do not appear in the keyword inventory may have value because they may reflect proper names of businesses or products. In some embodiments, the keyword inventory is described by a search tree (e.g. Ternary Search Tree), and each character is stored in a node in the tree such that one or more nodes linked together define a keyword. The end node contains a Boolean flag set to true if that node is the end of a keyword. A keyword can contain one or more lexicons. A lexicon is defined to be one or more non-white space characters. For example, a word in the English language is lexicon. In some embodiments, the tree is searched for the longest set of lexicons which comprise a keyword in the search tree. For example, if "cereal" and "cheap cereal" are both keywords, and a received message includes the text "buy some cheap cereal," then "cheap cereal" is identified as a keyword because it is the longest set of lexicons. In some embodiments, the keyword inventory may be divided into several databases. One database may contain a set of words or phrases that are sorted by frequency of use among a population of users (a "global database"), one database may contain a set of words or phrases that are sorted by frequency of use by the specific user of the mobile device (a "user database"), and one database may contain a set of words or phrases that have been purchased by advertisers for purposes of showing advertisements to a user (an "advertisement database"). One or more of the databases may be used by the system to identify keywords in the message. Processing efficiencies are gained by using an on-device keyword inventory rather than using a remote keyword inventory with each mobile device. Updates to the keyword inventory may be streamed to the mobile device in real-time or at predetermined intervals using a push data channel, such as Over-The-Air (OTA), Over The Air Parameter Administration (OTAPA), Firmware Over The Air (FOTA), Synchronization Markup Language (SyncML), or the equivalent. In some embodiments, the keyword inventory may be continuously or periodically updated based on a user's behavior. For example, if a user frequently navigates to ESPN.com to view Tom Brady's statistics, the user database may be updated to include "Tom Brady" and/or "Patriots" as keywords. By making the keyword inventory in the mobile device 100 dynamic, the user is provided with a richer and more accurate user experience, greater protection may be afforded to the privacy of the user, and the network services are enabled to learn from the user behavior to more accurately predict user-selected services.

Keywords may also be identified within received message 102 using a keyword inventory stored on one or more network servers. Keyword identification may automatically occur as a message is transiting the network servers, or may be performed as a remote service at the request of the sending and/or receiving device. For example, vendors may implement one or more manufacturer database programming interfaces to allow words and phrases from off-device databases (e.g., the phonebook) to be identified as keywords.

Keywords may be manually or automatically identified within received message 102 at a sending device, such as a computer or another mobile user, prior to sending the message to the recipient. For example, if a message contains the name of a friend, and the friend is listed in the phone book of the sending device, the sending device may automatically identify the friend's name as a keyword. When a keyword is identified at the sending device, the sending device may also associate one or more contexts and/or context parameters with the identified keyword. For example, if the sending device identifies a friend's name as a keyword, the sending device may also associate the phone number of the friend with the keyword so that the receiving device can easily place a call to that friend. The facility may also identify one or more contexts and/or context parameters associated with the keyword identified by the sending device irrespective of whether the sending device specifies a context and/or context parameter.

Keywords may be manually identified within received message 102 by the mobile device user. In some embodiment, keywords manually identified by the user are added to the keyword inventory.

Figure 2:
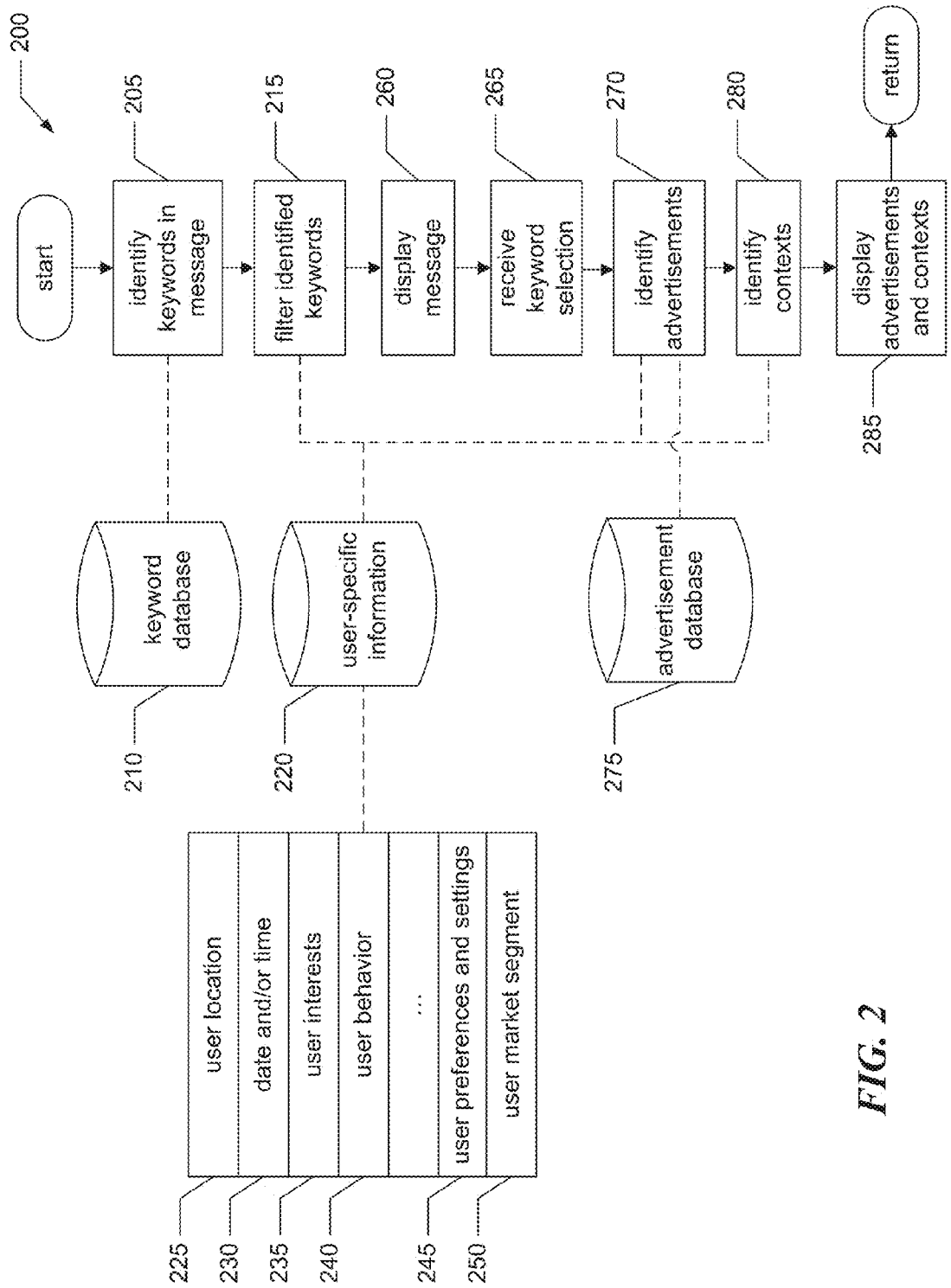
FIG. 2 is a block diagram of a method of processing a message in order to identify keywords, advertisements, and contexts associated with the message.

FIG. 2 is a block diagram of a process 200 by which keywords are automatically identified in a message and services targeted to a user in a manner that takes into account information about the user of the mobile device. At block 205, keywords are identified in the message 102 by the facility using one or more keyword databases 210 such as those local and remote keyword databases described herein. At a block 215, the identified keywords are tailored to the user by filtering the identified keywords using various user-specific information 220 that is ascertained or maintained about the user. User-specific information 220 may include: the user location 225; the date and/or time 230 that a message is sent or received by the mobile device; the user interests 235; the user behavior 240; the user preferences and settings 245; and/or the user market segment 250. User-specific information 220 may include other information not mentioned here.

The user location 225 is determined by the location of the mobile device. The location of the mobile device may be determined by global-positioning satellite (GPS) signals, triangulation from broadcast tower signals, manual entry by the user, or other locating technique.

The user interests 235 may be determined by observing text the user has entered, past searches that the user has performed, favorites that are bookmarked by the user on a network browser of the mobile device, messages the user may have sent or received, or other indications of subject matter that are of interest to the user. For example, the mobile device may include a record of the user's pattern of use of certain words, phrases, URLs, etc. As another example, the mobile device may include a record of purchases made by the user. As yet another example, the mobile device may include a record of the user's entertainment media, such as available audio and video media titles that are stored on or accessible via the user's device.

Past or future user behavior 240 may be determined by logging recent phone calls that the user may have made to or received from businesses or individuals on the mobile device, calendar data reflecting past or future meetings that the user attended or may attend, and other information associated with activities of the user.

User preferences and settings 245 may be manually specified by the user. Such preferences and settings may include, for example, the weight that should be applied to various types of user-specific information when selecting keywords or advertisements, whether various categories of user-specific information should be utilized or not utilized in selecting keywords or advertisements, the number of keywords that should be highlighted in a particular message, etc.

The user market segment 250 may be determined by information received from the user, received from a third party (e.g., service provider), and/or inferred through the user's use of the mobile device. A market segment is a defined group of users that share one or more characteristics. Such characteristics may include, for example, geographic characteristics (e.g., location, density (urban, semi-urban, rural), climate, etc.); demographic characteristics (e.g., age, gender, family size, education, income, occupation, socio-economic status, religion, ethnicity, language, etc.); and/or behavioral characteristics (e.g., product usage rate, brand loyalty, readiness-to-buy, income status, etc.). Any population of individuals may be divided into two or more market segments by the facility, wherein the characteristics of each market segment are determined to provide information that is helpful in targeting advertisements or services to a user in that respective segment.

Figure 3:
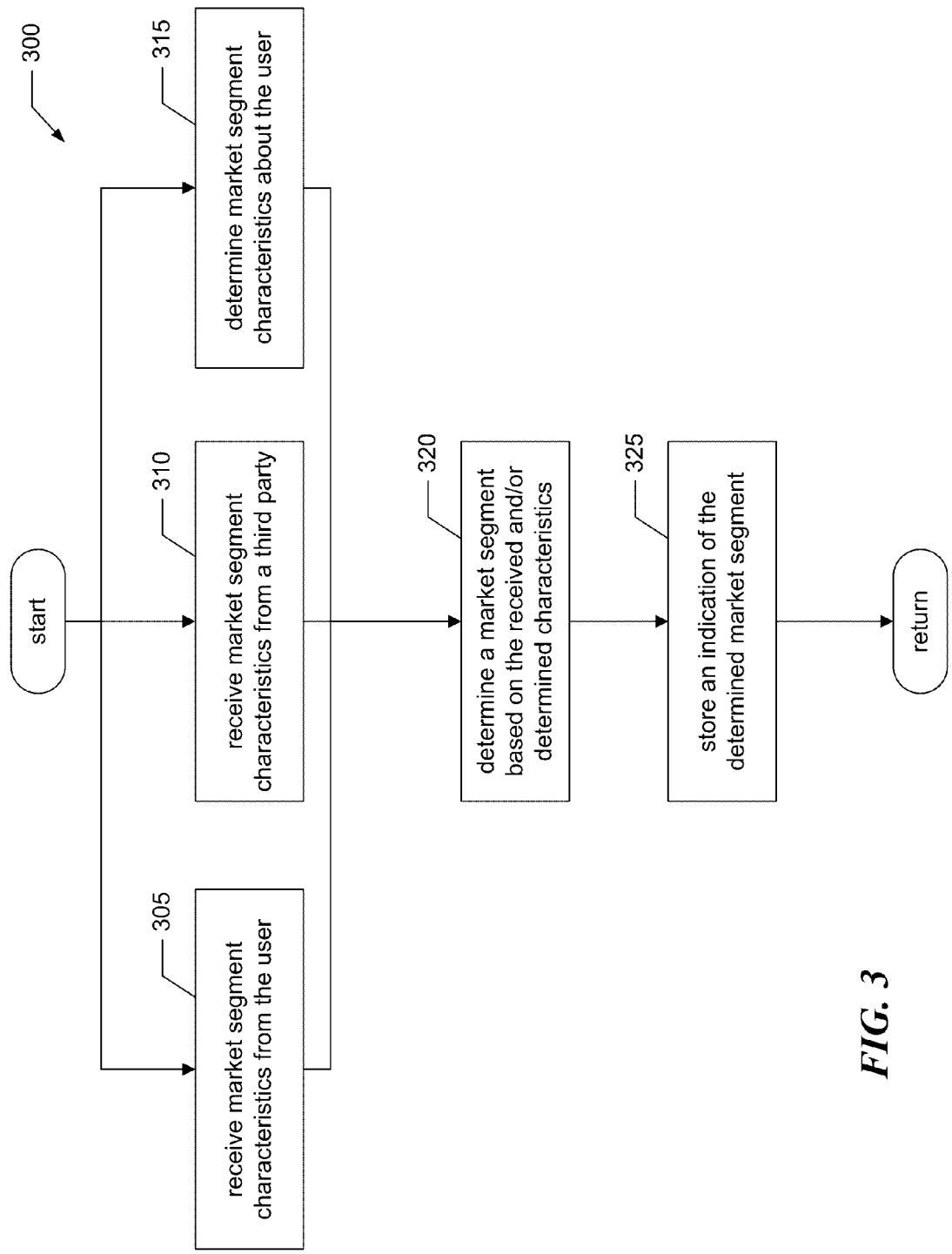
FIG. 3 is a block diagram of a method of determining a market segment of a user of a mobile device.

FIG. 3 is a block diagram of a process 300 for determining a market segment of a user of a mobile device. In some embodiments, process 300 is performed by mobile device 100. At a block 305, the facility receives characteristics from the user that may be used to place the user within a particular market segment. For example, such information may be manually entered by the user through a user interface displayed on the mobile device. The facility may present a series of questions to the user to elicit demographic or other information from the user that may be utilized by the facility. At a block 310, the facility receives characteristics about the user from a third party, such as the user's service provider, For example, when a user establishes an account with a service provider, the provider may request or require the user to answer a survey. As other example, the user's service provider may be able to obtain information about the user based on the user's use of various services offered by the service provider. At a block 315, the facility determines certain characteristics about the user that may be used to place the user within a particular market segment. For example, the facility may determine certain geographic characteristics of the user based on the most commonly occurring user location. As another example, the facility may determine certain demographic characteristics of the user by profiling messages the user may have sent or received. Messages that include or frequently include certain terms may indicate the age of the user (e.g., teenagers tend to use a variety of "chat abbreviations" that are unknown or infrequently used by adults). As yet another example, the facility may determine certain behavioral characteristics (e.g., brand loyalty) of the user by maintaining a log of purchases made by the user and/or profiling messages.

At a block 320, the facility assigns the user to a market segment based on the received and/or determined characteristics of the user. Those skilled in the art will appreciate that any number of market segmentation schemes may be used. In some embodiments, the facility assigns a weight to the received and/or determined characteristics. For example, the facility may assign a greater weight to characteristics received from the user. As another example, the facility may assign a greater weight to characteristics that are both received from the user and determined by the facility observing the user's interaction with the mobile device over a period of time.

At a block 325, an indication of the determined market segment is stored on the mobile device. In some embodiments, a user's market segment is represented by a numerical value. For example, the number 1 may represent a user that is part of the "Double Income No Kids Yet" (DINKY) market segment and the number 2 may represent a user that is part of the "Young Urban Professional" (YUPPIE) market segment. By storing an indication of the user market segment, the user's market segment can be shared with others (e.g., with advertising services) without violating the user's privacy by exposing the underlying characteristics of the user.

After block 325, the process returns. Users may be part of one or more market segments, and such market segments may change over time. The market segment of a user may be determined (e.g., using process 300) on a sporadic basis, on a periodic basis, during periods of low activity, for any predefined event, etc.

Returning to FIG. 2, the user-specific information 220 may be accumulated by the facility and stored on the mobile device 100 and/or stored by a remote service. When filtering relevant keywords within a received message at block 215, the facility may use the user-specific information to select certain terms as keywords over other terms. For example, a user may receive a message from a friend indicating that the friend is going to "catch a bus to the stadium and watch the Packers play." The facility may choose to highlight the term "Packers" as a keyword over the terms "bus" or "stadium" because the user may be a Packers football fan as indicated by stored user-specific information (e.g., previous messages from the Packers fan club, bookmarked pages pertaining to the Packers, etc.). Alternatively, the facility may choose to highlight the term "stadium" if the user is a Bears fan and would therefore not likely be interested in the Packers. Regardless of which keyword the facility highlights, of course, the user may be able to select a different term and indicate that the term should function as a keyword in the message. Such an indication may be stored in user preferences and settings 245 for future use or the keyword may be added to the keyword inventory 210. Those skilled in the art will appreciate that privacy concerns are reduced by the facility because the user-specific information may be maintained locally, rather than at a remote server. Any personalized information is thereby used to identify keywords in a manner that makes it more difficult for personal information to be inadvertently shared. Also, by maintaining such information locally, the facility is able to tailor keywords more accurately than is possible using demographic information alone.

At a block 260, the facility displays the message 105 with highlighted keywords. At a block 265, the facility receives the selection of a keyword by a user. The user may select a keyword by clicking on, hovering over, moving a cursor to and selecting, or otherwise identifying one of the highlighted keywords in the message.

At a block 270, the facility identifies advertisements that may be associated with the selected keyword. The advertisements are selected from a local advertisement database 275, and may be tailored to a particular user using user-specific information 220 associated with the user. For example, the facility may associate an advertisement for Starbucks with the keyword "coffee" because the user is known to repeatedly search for local Starbucks locations when traveling with the mobile device. As will be described in additional detail herein, such advertising may be surfaced to the user by highlighting the word "coffee" in the received message and displaying the Starbucks advertisement when the user selects the keyword "coffee." The advertising may also be surfaced to the user by displaying a Starbucks advertisement the next time the user enters the keyword "coffee" on the device. As another example, in a message containing the keyword "pizza" the facility may select advertisements to the user's favorite pizza restaurant (e.g., John's Pizza) if the phone number for John's Pizza is stored in the phonebook of the mobile device. Also, the facility may select advertisements for pizza restaurants that the user frequently patrons, or for pizza restaurants close to the user's location. In addition, the facility may also determine that the word "pizza" forms the word pair "Pizza Hut," and the facility may select Pizza Hut advertisements to the user. The local advertisement database 275 may be stored on the device and periodically updated to reflect those advertisements that are likely to be of interest to the user. Additional advertising content may be obtained by making subsequent requests to an advertising service as detailed herein.

At a block 280, the facility identifies one or more contexts that are associated with the keyword. A context is a request for an additional class of information pertaining to that keyword. The contexts associated with a keyword may include, but are not limited to, products, services, directory information, maps, web searches, ringtones, music, games, or news. Different contexts associated with the keyword may be selectively identified depending on the selected keyword or other content in the received message. In some embodiments, there is a default context list to which contexts may be added or subtracted. The selection of contexts to display may be based on usage patterns (e.g., frequently selected contexts, learned preferences), the current location, locale (language preference), user profile, and so forth. A context list for a keyword that has more than one meaning may be selected based on the content of the message. For example, the keyword "New York" may be a location (i.e., New York state or city) or it may be a description of food (e.g., New York strip steak). Ambiguities may also be resolved based on information learned about the user. For example, if the user is a football fan, then the keyword "chargers" may be interpreted as the football team (i.e., New York Chargers) and not battery alternatives.

At a block 285, the identified advertisements and contexts are displayed to the user. The user is able to select a displayed advertisement or context to receive additional content that is beneficial to the user.

Those skilled in the art will appreciated that the blocks shown in FIGS. 2 and 3 may be altered in a variety of ways. For example, the order of blocks may be rearranged; sub-steps may be performed in parallel; shown blocks may be omitted; or other blocks may be included; etc.

Returning to FIG. 1, as shown on the mobile device screen, keywords 110 that are identified in a message 105 are highlighted for the user in the modified message 105. If the user selects a keyword 110, the facility provides the user with one or more advertisements and contexts in an advertisement and context selection menu 115 that is associated with the selected keyword. The advertisement may be the actual text of an advertisement, or a link to additional advertisement information (e.g., the link to receive a "*FREE COUPON*" or "Try our new drink!"). Different advertisements associated with the keyword may be selectively included or omitted depending on the selected keyword or other content in the received message. The order of the advertisements may also be varied based on the keyword or other contents of the received message.

In addition to displaying advertisements, the facility displays a list of contexts 115 to the user. The order of the contexts in the context list may be varied based on the keyword or other contents of the received message. For example, if the sending device identified a keyword and an associated context, the associated context may be listed first. By providing the mobile user with a list of contexts that are associated with the selected keyword, the facility simplifies the number of steps that the user must take to navigate to additional useful information related to the keyword or the contents of a received message.

If the user selects an advertisement or a context (e.g., if the user selects the "*FREE COUPON*" advertisement or "Map" context associated with the keyword "coffee"), the facility submits a user request 120 to a keyword gateway 125 over a network 155. Network 155 may be a cellular network, such as a cellular digital packet data (CDPD) network, a Global System for Mobile (GSM) network, a Time Division Multiple Access (TDMA) network, a Code Division Multiple Access (CDMA) network, or an IP-based wireless network, such as IEEE 802.16 (WiMAX), IEEE 802.20 Mobile Broadband Wireless Access (MBWA), Ultra Wideband (UWB), 802.11 wireless fidelity (Wi-Fi), or Bluetooth network, etc. The user request 120 may include a user-selected Wireless Access Protocol ("WAP") link with the keyword and code or command reflecting the selected advertisement/context. The user request 120 may also include other parameters related to the user's selected keyword, including authentication information associated with the user (e.g., a password), location-based information, user-specific information such as market segment, or some or all of the message 105 to enable further keyword processing. The keyword gateway 125 retrieves the information requested by the user-selected advertisement or context from a variety of local or remote network services, such as an advertisement aggregator 130, directory services 135, mapping services 140, content aggregator 145, or other service. The requested information 150 is transmitted to the mobile device, where it can be acted upon by the mobile user.

To protect potentially confidential information of a user, the facility may send market segment information in the user request 120 rather than the underlying user data that placed the user in that market segment. For example, if a user selects an advertisement related to a keyword, the facility may send the acronym "YUPPIE" to an advertising service. An indication of the user's market segment can then be used to select advertisements to which the user is more likely to respond. If a user is identified as within the YUPPIE market segment, for example, the advertising service may select advertisements for a trendy (more expensive) pizza café rather than a generic (less expensive) pizza take-out restaurant. By sending an indication of the user market segment rather than the characteristics of the user used to determine the market segment, the user's privacy is protected.

In some circumstances, it may be beneficial to include personally-identifiable or other user information in the user request 120 that is sent to external services. For example, if a user is requesting a map of a store, it may be beneficial to include the current location of the user so that turn-by-turn instructions may be provided to the user on how to locate the store. As another example, the facility may include the location of appointments held by the user so that advertisements for locations near those appointments can be suggested by the advertising aggregator. If user data is required for a specific service request, the facility may notify the user and allow the user to decide whether to include the personally-identifiable or other user data in the request. Privacy concerns are reduced because the user is provided the option of sending the data to the service. The facility may further allow the user to specify whether the entire message is sent to the keyword gateway 125 for processing, or only the keyword is sent for processing.

Various charges may be imposed by the facility operator as services are provided to the user. The facility operator may charge the mobile user for service information that is delivered to the mobile user, such as for music, ringtones, maps, directory lookup, and other content. The facility operator may also charge the network service each time a user requests to receive data from the network service or each time that an advertisement for the network service is displayed or acted upon. Merchants and service providers are often willing to pay for the opportunity to push advertising content to a mobile user, particularly if the pushed advertisement can be tailored in some fashion (e.g., by geography, demographics, or interests) for the mobile user. Merchants and service providers may also be charged by the facility operator in order for keywords associated with the merchant and service provider to be highlighted in a text message.

It will be appreciated that the mobile device user may turn the keyword identification feature off or on as needed. Additionally, if a user has opted out of the keyword identification feature, the user may activate the feature on a per message basis. The user may also request services even if no keyword is identified, such as by manually selecting one or more keywords in a message (e.g., in search results or other displayed or entered text).

Those skilled in the art will appreciate that various architectural changes to the facility may be made while still providing similar or identical functionality to mobile device users. For example, keyword gateway 125 may be omitted from the facility and users allowed direct access to the various network service servers. As another example, the keyword gateway functionality may be built into or combined with the functionality provided by one or more of the network service servers.

Figure 4:
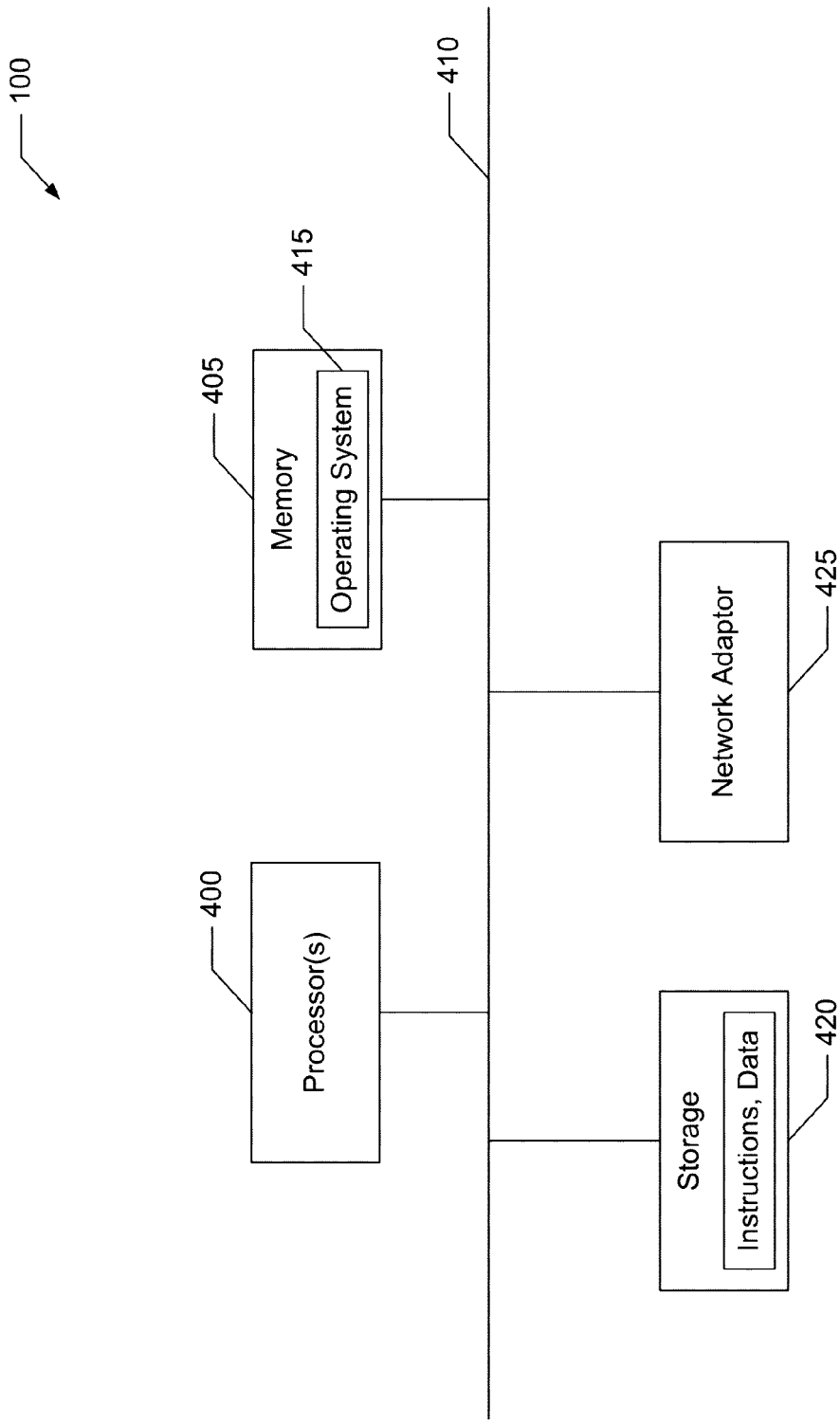
FIG. 4 is a block diagram depicting the components of a mobile device.

FIG. 4 is a block diagram showing an example architecture of a mobile device, such as mobile device 100. Those skilled in the art will appreciate that certain well-known structures and functions have not been shown or described in detail to avoid obscuring the description. As illustrated, a mobile device includes one or more processors 400 and memory 405 coupled to an interconnect system 410. The interconnect system 410 shown in FIG. 4 is an abstraction that represents any one or more separate physical buses and/or point-to-point connections, connected by appropriate bridges, adapters and/or controllers. The interconnect system 410 may include, for example, a system bus, a form of ISA (Industry Standard Architecture) bus, a Peripheral Component Interconnect (PCI) bus, a HyperTransport or industry standard architecture (ISA) bus, a universal serial bus (USB), a Micro Channel Architecture (MCA) bus, a Video Electronic Standard Association (VESA) bus, or an Institute of Electrical and Electronics Engineers (IEEE) standard 1394 bus (sometimes referred to as "Firewire").

The processors 400 are the central processing units (CPUs) of the mobile device and control its overall operation. In some embodiments, the processors 400 accomplish this by executing software stored in memory 405. A processor 400 may be, or may include, one or more programmable general-purpose or special-purpose microprocessors, digital signal processors (DSPs), programmable controllers, application specific integrated circuits (ASICs), programmable logic devices (PLDs), or the like, or a combination of such processors.

Memory 405 includes the main memory of the mobile device. Memory 405 represents any form of random access memory (RAM), read-only memory (ROM), flash memory, or the like, or a combination of such devices. Memory 405 stores, among other data, the mobile device's operating system 415. Also connected to the processors 400 through the interconnect system 410 are one or more storage components 420 and a network adapter 425. Storage components 420 may be or include any conventional medium for storing data in a non-volatile manner, such as flash memory. The network adapter 425 allows the mobile device to communicate with other devices. The network adapter may include, for example, an interface for a CDPD network, a GSM network, a TDMA network, a CDMA network, IP network, or the like, or a combination of such interfaces.

Figure 5:
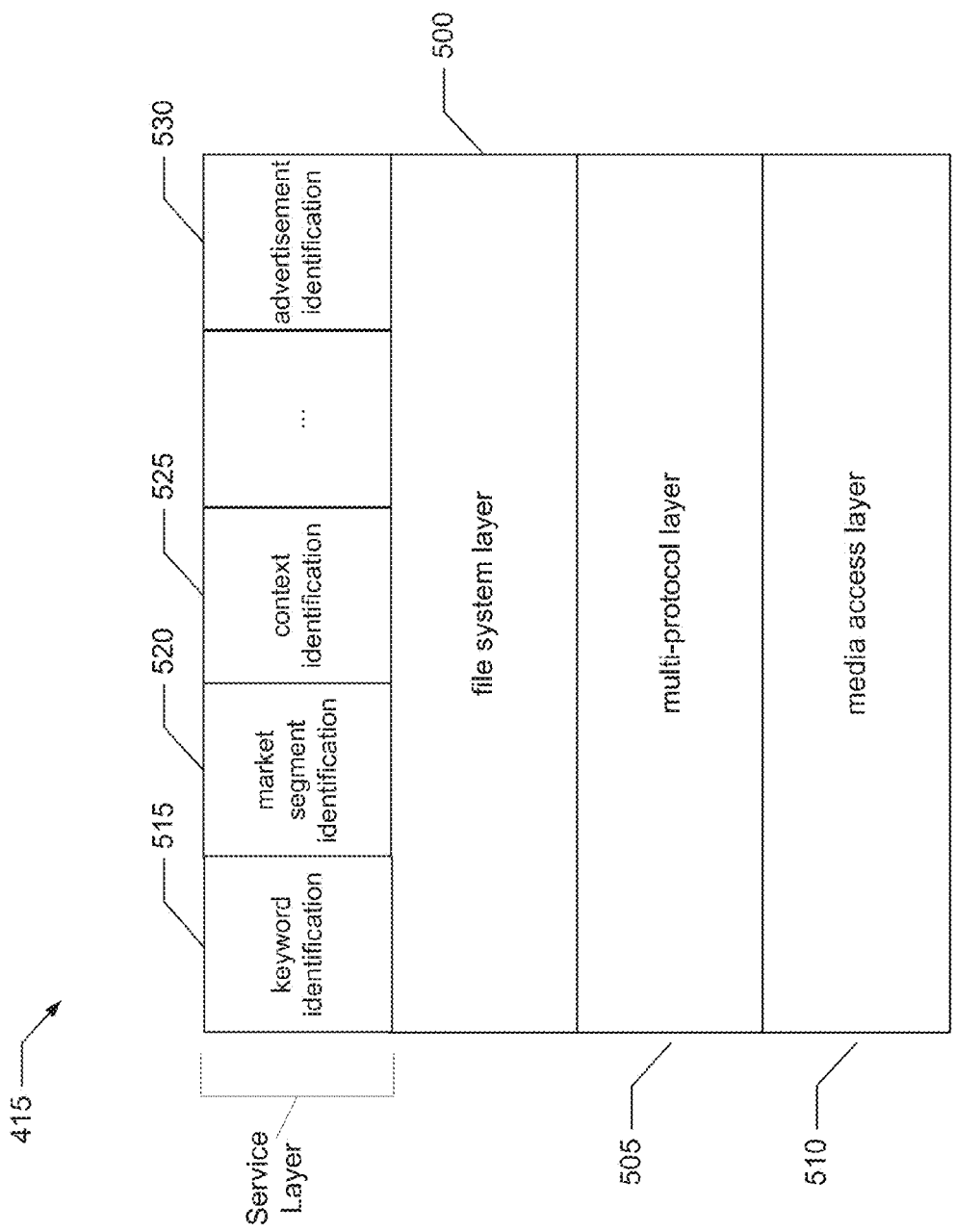
FIG. 5 is a block diagram depicting the components of an operating system of a mobile device.

FIG. 5 shows an example of the architecture of the operating system of a mobile device 100. As shown, the operating system 415 comprises several software layers, including a file system layer 500. The file system layer is an application-layer software that imposes a structure on the data stored in the mobile device. Logically "under" the file system is a multi-protocol layer 505 and an associated media access layer 510, which collectively enable the mobile device to communicate over a network with other devices. The multi-protocol layer 505 implements various higher-level network protocols, such as Wireless Access Protocol (WAP), Handheld Device Transport Protocol (HDTP), Hypertext Transfer Protocol (HTTP), and/or Transmission Control Protocol/Internet Protocol (TCP/IP). The media access layer 510 includes one or more drivers which implement one or more lower-level protocols to communicate over the network. In some embodiments, the operating system 415 also includes various service layers logically "above" the file system layer 500. For example, operating system 415 may include a keyword identification service 515, a market segmentation service 520, a context identification service 525, and an advertisement identification service 530. The operating system may also include other services not mentioned here. Those skilled in the art will further appreciate that some or all of the services may be implemented by a device other than mobile device 100. For example, in some embodiments, the advertisement identification service 530 is implemented at an advertising server.

Figure 6:
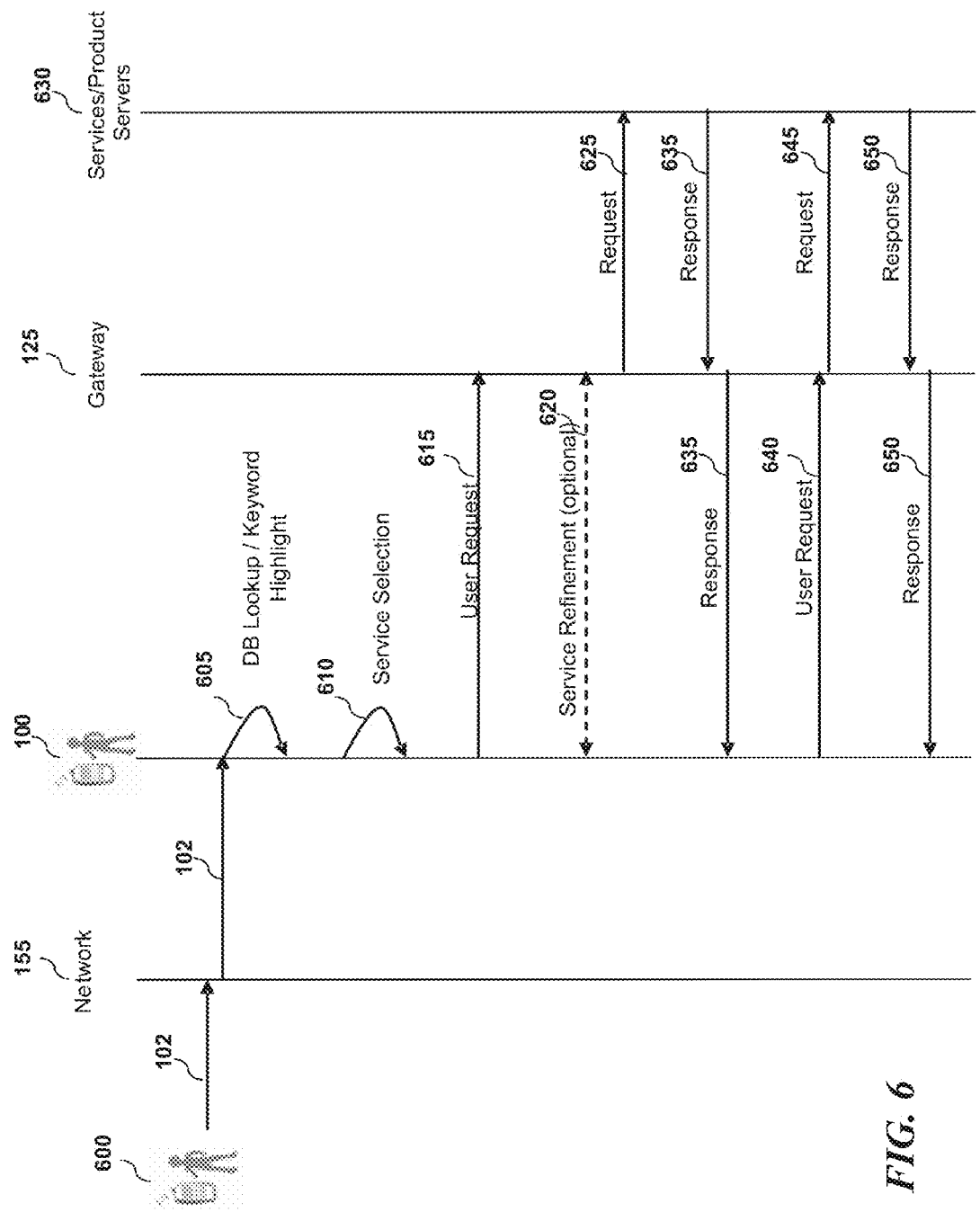
FIG. 6 is a communication diagram illustrating an exchange of messages to provide services to a mobile device.

FIG. 6 is a communication diagram that illustrates a communication exchange when the user of a mobile device 100 requests one or more services based on keywords contained in a received message. The communication flow begins when a message 102 is transmitted from a sender device 600 to a mobile device 100. The sender device 600 may be another mobile device, computing device, or service capable of routing communications through network 155. The message 102 is communicated via the network 155 and received by mobile device 100. At step 605, the facility parses the message 102 to intelligently match keywords contained in the message with one or more keyword databases stored in the mobile device or accessible remotely from the mobile device. Keywords are highlighted for display in the message.

If the user selects a keyword, at step 610 the facility provides the user with one or more advertisements and/or one or more contexts associated with the keyword. Advertisements may include special offers, coupons, additional information about products or services, or other content to entice a user to use a particular product or service that is related to the keyword. Contexts may include directory information, maps, web searches, ringtones, music, games, or news related to the keyword. If the user selects an advertisement or context, the facility submits a user request 615 with the keyword and an indication of the advertisement or context to the keyword gateway 125. The user request 615 may include additional parameters associated with the user, including authentication information, user-specific information such as a market segment, location-based information, or some or all of the message for further processing. In some embodiments, the parameters are sent to the keyword gateway 125 by embedding the parameters in a web link used to connect to the gateway. Embedding the parameters in a web link minimizes the time and amount of network resources necessary to request a service. At step 620, the facility may send a message to the user asking the user to refine the context or keyword. That is, the user may be requested to provide additional information pertaining to the context or keyword that may be used to fulfill the service request.

Once the keyword gateway 125 receives a user request 615, the keyword gateway 125 makes a request 625 to the appropriate network service server 630. The keyword gateway 125 utilizes one or more algorithms to intelligently process the parameters of the user request 615 and refine and redirect the request to the appropriate network service server. For example, network services may include advertisement aggregator services, directory services, mapping services, content aggregators, or other services. The appropriate network service server 630 receives and processes the request 625 and sends an appropriate response 635 to the mobile user, containing an advertisement, map, links to downloads, etc.

The keyword gateway 125 provides the mobile device 100 with the response 635. The response is provided to the mobile device 100 in a convenient form (e.g., XHTML), through an appropriate application (e.g., microbrowser), and in response to the keyword and user-selected context. For example, the response may include prepopulated search results, content, advertisement, an applet from a selected service provider, or a message. Once the mobile device 100 receives the response 635, the user may take an action based on the response, such as making a purchase from the advertised products or services contained in the response.

If the user takes an action based on the response 635, the mobile device 100 submits the user request 640 to the keyword gateway 125. The keyword gateway 125 appropriately handles the requested action, such as by making a request 645 to the appropriate network service server 630. The network service server 630 receives and processes the request, and sends a response 650 that is specific to the user's action. The keyword gateway 125 provides the mobile device 100 with appropriate messaging 650 that contains results from the requested service. Various billing and reconciliation may be performed by the facility operator based on the service request of the user, and charges imposed against any combination of the requesting user, service provider, or other party.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples, and alternative implementations may employ differing values or ranges. Those skilled in the art will also appreciate that the actual implementation of a database may take a variety of forms, and the term "database" is used herein in the generic sense to refer to any data structure that allows data to be stored and accessed.

We claim:

1. A method on a mobile device of providing keyword-based services to a message recipient, the method comprising:

receiving a message containing text at a mobile device of a user;

identifying one or more keywords in the received message, wherein at least some of the plurality of keywords are identified by comparing words in the text message with a keyword inventory that is maintained on the mobile device, wherein the keyword inventory includes word frequency information characterizing frequency of use of words in the keyword inventory by the user or frequency of use of words in the keyword inventory among a population of users, and wherein less frequently used words of the keyword inventory are more likely to be identified as keywords;

profiling the user based on observed user activity on the mobile device and based on terms used in messages received by the user;

selecting a subset of the keywords based on user-specific information, including the profile of the user, stored on the mobile device;

displaying the received message to the user, wherein the text of the displayed message is formatted to distinguish the subset of keywords in the displayed message;

associating the distinguished keywords with at least one advertisement and at least one contextual service;

receiving a selection of a distinguished keyword in the displayed message by the user;

displaying to the user an indication of at least one advertisement or at least one contextual service associated with the selected keyword;

receiving a selection of an indicated advertisement or contextual service from the user; and invoking the selected advertisement or contextual service, wherein the invoking includes transmitting the selected keyword and at least a portion of the user-specific information to the selected advertisement or contextual service.

2. The method of claim 1 wherein the message is an SMS or MMS message.

3. The method of claim 1 wherein profiling the user based on observed user activity on the mobile device includes profiling the user based on phone calls placed by the user on the mobile device, or calendar data reflecting meetings of the user on the mobile device, or location data representing movement of the mobile device, or purchases made by the user on the mobile device, or a record of audio and video media titles that the user has stored on or made accessible via the mobile device.

4. The method of claim 1 wherein profiling the user includes determining a market segment of the user.

5. The method of claim 4 wherein the market segment of the user identifies the user as a member of a defined group of users that share a characteristic.

6. The method of claim 4 wherein transmitting at least a portion of the user-specific information to the selected advertisement or contextual service includes transmitting an indication of the market segment of the user.

7. The method of claim 1 wherein associating each of the determined keywords with at least one advertisement and at least one contextual service includes resolving ambiguity based on the user-specific information.

8. The method of claim 7 wherein resolving ambiguity includes selecting a meaning for a keyword that has more than one meaning.

9. A system for providing keyword-based services to a recipient of a message on a mobile device of a user, the mobile device having a memory storing computer-executable instructions and a processor for executing computer-executable instructions, the system comprising:

a keyword management component configured to maintain a keyword inventory on the mobile device, wherein the keyword inventory includes word frequency information characterizing frequency of use of words in the keyword inventory by the user or frequency of use of words in the keyword inventory among a population of users;

an identification component configured to identify one or more keywords in a received message containing text by comparing text in the message with the contents of the keyword inventory, wherein words characterized by the word frequency information of the keywords inventory as less frequently used are more likely to be identified as keywords;

a user information component configured to retrieve user-specific information including a profile of the user;

a filtering component configured to select a subset of keywords from the identified plurality of keywords, wherein the selecting is based on the user-specific information;

a service association component configured to associate the subset of keywords with one or more advertisement and contextual service;

a display component configured to display the received message to the user and to display for selection one or more of the advertisements or contextual services associated with a keyword if a user selects one of the subset of keywords in the received message;

an interface component configured to receive a selection of a keyword and an associated remote service by a user; and a communication component configured to invoke the service.

10. The system of claim 9 wherein the keyword management component is further configured to update the keyword inventory based on user behavior.

11. The system of claim 9 wherein the identification component is further configured to identify a keyword in the received message by comparing text in the message with the contents of a remotely maintained keyword inventory.

12. The system of claim 9 wherein the profile of the user includes a market segment of the user, and wherein the filtering component is configured to determine a subset of keywords based on the market segment of the user.

13. The system of claim 9 wherein the service association component is further configured to associate each of the subset of keywords with one or more services by resolving ambiguity based on the user-specific information.

14. The system of claim 13 wherein resolving ambiguity includes selecting a meaning for a keyword that has more than one meaning.

15. A computer-readable memory encoded with instructions that, if executed by a mobile device of a user, cause the mobile device to:

receive a message containing text at a mobile device of a user;

identify one or more keywords in the received message, by comparing text in the message with contents of a keyword inventory that includes word frequency information characterizing frequency of use of words in the keyword inventory by the user or frequency of use of words in the keyword inventory among a population of users,
wherein words characterized by the word frequency information of the keyword inventory as less frequently used are more likely to be identified as keywords;

profile the user based on observed user activity on the mobile device and based on terms used in messages received by the user;

select a subset of the keywords based on user-specific information, including the profile of the user, stored on the mobile device;

display the received message to the user, wherein the text of the displayed message is formatted to distinguish the subset of keywords in the displayed message;

associate the distinguished keywords with at least one advertisement and at least one contextual service;

receive a selection of a distinguished keyword in the displayed message by the user;

display to the user an indication of at least one advertisement or at least one contextual service associated with the selected keyword;

receive a selection of an indicated advertisement or contextual service from the user; and invoke the selected advertisement or contextual service, wherein the invoking includes transmitting the selected keyword and at least a portion of the user-specific information to the selected advertisement or contextual service.

16. The computer-readable memory of claim 15 wherein the user-specific information includes a market segment of the user.

17. The computer-readable memory of claim 16 wherein transmitting at least a portion of the user-specific information to the selected advertisement or contextual service includes transmitting an indication of the market segment of the user.

18. The computer-readable memory of claim 15 wherein associating each of the determined keywords with at least one advertisement and at least one contextual service includes resolving ambiguity based on the user-specific information.

19. The computer-readable memory of claim 18 wherein resolving ambiguity includes selecting a meaning for a keyword that has more than one meaning.

20. The computer-readable memory of claim 15 wherein invoking the selected advertisement or contextual service comprises requesting information from a service on the device, or requesting information from a remote service, or initiating a call from the mobile device.

* * * * *